Oct. 13, 1959 — O. MAISCH — 2,908,282

AUTOMATIC VENT VALVE

Filed Feb. 26, 1957

INVENTOR.
OLIVER MAISCH

BY *Wm. F. Freudenreich*

ATTORNEY.

United States Patent Office 2,908,282
Patented Oct. 13, 1959

2,908,282

AUTOMATIC VENT VALVE

Oliver Maisch, Chicago, Ill.

Application February 26, 1957, Serial No. 642,524

1 Claim. (Cl. 137—199)

In modern industry it is very important in many fields of endeavor that adequate tests be made of a great variety of products, to ensure against leakage of fluids under pressure contained in or passing through the same, before such products are put to their intended uses.

When making such tests by the introduction of liquids under pressure, the air in the spaces to be occupied by the liquids must be expelled. This is commonly done by inserting a vent plug in some opening leading from such a space while liquid is delivered into the space through another opening.

The object of the present invention is so to construct a vent plug that it need only be screwed into an opening and be left there until the test is completed; regardless of whether the same be pointing up, down or in any other direction; which shall instantly seal such opening after all the air has been expelled and before any liquid can escape; and which shall operate equally well at all pressures of the testing fluid, whether they be low or extremely high.

In carrying out my invention I employ a piston which carries the movable member of a valve device, and which is yieldingly held in its idle position by a spring; fluid pressure within the space being tested opposing the spring; the parts being so proportioned that so long as there is air in such space the fluid pressure cannot rise to a level sufficient to force the piston into the valve-closing position; and the path of escape being so restricted beyond the piston, relatively to the cross sectional area of the piston, that fluids entering the plug set up a differential pressure tending to move the piston into the valve-closing position, which pressure is not sufficient, however, to move the piston while only air is flowing. Upon the entry of uncompressible liquid into the plug the differential pressure instantly becomes great enough to operate the piston and effect a seal.

The various features of novelty whereby the present invention is characterized will hereinafter be pointed out in the claims; but, for a full understanding of the invention and its object and advantages reference may be had to the following detailed description taken in connection with the accompanying drawing, wherein:

Figure 1:
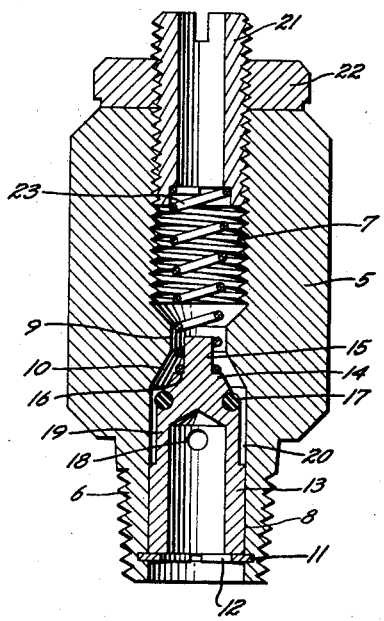
Fig. 1 is an axial section through a device embodying the present invention, the valve being open.

In the following description "top" and "bottom," and similar expressions, are used for convenience to designate, respectively, the outlet end shown at the top in the drawing, and the inlet end that is adapted to be screwed into the product to be tested; for in actual use either end may be above or below the other.

In the drawing 5 represents a one-piece, sturdy body member, preferably composed of stainless steel. This member terminates at its lower end in a portion 6 of reduced diameter and having thereon a standard pipe thread. This body member contains an axial bore composed of several sections. In the arrangement shown, the upper section 7 and the bottom section 8 are cylindrical and may be of the same diameter except that the lower end of section 7 is contracted to provide a short cylindrical neck 9 of smaller diameter. The upper end of section 8 is connected to the neck portion by a frusto-conical section 10. The wall surrounding the bore is grooved near the lower end of the bore to provide an annular groove 11 opening out from the bore.

A detachable split retaining ring 12 is fitted into groove 11 and protrudes therefrom into the main bore in the manner of a little shelf.

Within the lowest section of the bore is a piston 13 in the form of a deep cylindrical cup that normally rests, upside down, on the shelf-like part of the retaining ring. The bottom of the cup is extended upwardly as a frustum of a cone 14 complementary to the frusto-conical bore section 10. Part 14 terminates in a little post 15 that is smaller in diameter than the upper end of part 14, thereby leaving the latter with an upwardly facing shoulder 16 surrounding the base of the post. Surrounding the frusto-conical part of the piston and seated in an annular groove in such part, is a compressible O-ring 17 which, when free to do so, projects somewhat from the conical surface. The piston is provided with an opening 18 through the cylindrical wall just below the cup bottom. Also, the piston is reduced in diameter upwardly from a point somewhat below opening 18, as indicated at 19.

The parts are so proportioned that when the piston is resting on the retaining ring, as in Fig. 1, the frusto-conical part 14 extends up into the frusto-conical bore section 10 but stands clear of the surrounding surface in the overlapping zone. Consequently air that enters the lower end of the device can pass up through the interior of the piston and through opening 18 into annular space 20 around the part of the piston which is indicated at 19, and from there the air can rise up to and escape from the upper end of the bore. The cross-sectional area of such annular space in a plane, at right angles to the axis of the device, is less than the corresponding area of the bore in the piston, namely, the inner side of the bottom of the cup.

Screwed into the upper end of the bore is a sleeve 21 which may be secured by a lock nut 22 against accidental displacement after having been adjusted to suit the needs for a given test.

Within the bore in the body member is a long coiled compression spring 23, the lower end of which surrounds post 15 and rests on shoulder 16, while the upper end thrusts against the bottom edge of sleeve 21.

Figure 2:
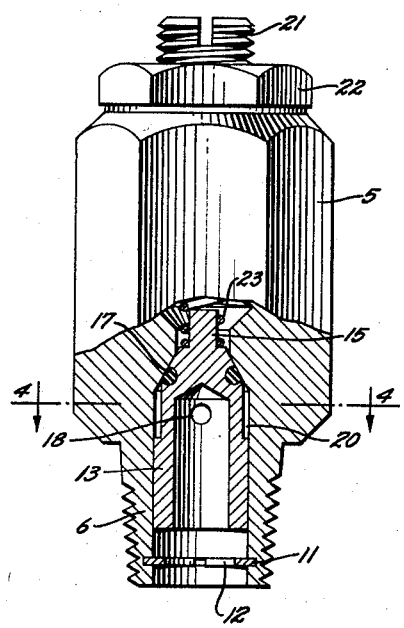
Fig. 2 is a view, partly in side elevation and partly as an axial section, the valve being closed.
Figure 3:
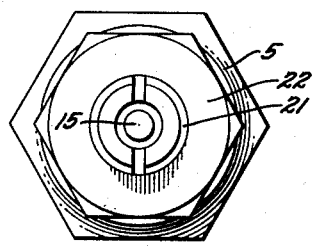
Fig. 3 is a top plan view of said device.
Figure 4:
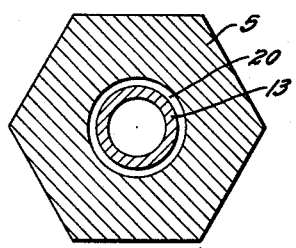
Fig. 4 is a section on line 4—4 of Fig. 2.

In the use of the device it is simply screwed into an opening communicating with a space to be tested, after which test liquid is delivered into such space through another opening. The valve, being open, remains so regardless of the angle at which the device stands, because the spring holds the piston against the retaining ring even though the device be upside down. Consequently air can escape freely before the advancing test liquid. However, when the uncompressible liquid reaches the device the piston is forced up into the position shown in Fig. 2, the bore being sealed so that no liquid can escape. This is due to the fact the constriction of the escape passage at 20 does not interfere with the ready flow of air; the air simply compressing, if need be, to pass into and through space 20 without creating a sufficient differential pressure to overcome the thrust of the spring, whereas liquid under pressure, entering the piston, creates instantly a differential pressure sufficiently great to shift the piston into its sealing position.

At the end of a testing operation, as soon as the liquid begins to drain, the spring returns the piston to its idle position and air enters freely through the device to compensate for the withdrawn liquid.

The initial pressure of the spring may be regulated by screwing the sleeve 21 in or out, depending on the characteristics of the particular test liquid that is to be used.

The size of the device is not important from a mere functional viewpoint. For example, a device as shown in the drawing and having a body member an inch and a quarter long, can be successfully used with pressures up to two thousand pounds per square inch.

While I have illustrated and described only a single preferred form of my invention it is my intent to cover all forms coming within the definitions of the invention constituting the appended claim.

I claim:

A vent plug in combination with a liquid system under pressure containing entrapped air, said vent plug comprising an elongated body member containing an open-ended axial bore which comprises a cylindrical first section at the inlet end, a second section at the outlet end and an intermediate section which is frusto-conical and decreases in diameter from the first section toward the second section; a floating valve member in the form of a cup fitting slidably in said first bore section with its open end facing outwardly and having a frusto-conical end complementary to the said intermediate bore section, a sealing element surrounding the said frusto-conical part of the valve member for engagement with the wall surrounding the intermediate bore section, a spring engaging the valve member and tending constantly to press it to the inlet end of the plug, there being a vent passage in part in the valve and in part in said bore to place the first bore section in communication with the second bore section when the valve member is retracted, the minimum cross-sectional areas of said vent passage being such that for a given liquid used air but not liquid may bleed past it at the prevailing pressure in the system, said passages terminating short of said sealing element when the valve member is in the valve-closed position, a portion of said passage being a hole through the cylindrical wall of the cup near its closed end, the area of the inner surface of the wall forming the bottom of the cup being greater than the minimum cross-sectional area of vent passage leading from the interior of the cup, and a rest for the valve member at the inlet end of the plug.

References Cited in the file of this patent

UNITED STATES PATENTS

| | | |
|---|---|---|
| 2,179,144 | Buttner | Nov. 7, 1939 |
| 2,351,035 | Grant et al. | June 13, 1944 |
| 2,605,779 | Smithisler | Aug. 5, 1952 |
| 2,684,684 | Stevenson | July 27, 1954 |
| 2,804,279 | Gould | Aug. 27, 1957 |